United States Patent
Vikramaboopathi et al.

(10) Patent No.: US 12,001,888 B2
(45) Date of Patent: Jun. 4, 2024

(54) SERVER INSTANCE ALLOCATION FOR EXECUTION OF APPLICATION INSTANCES

(71) Applicant: Hewlett Packard Enterprise Development LP, Spring, TX (US)

(72) Inventors: Madhusuthanan Vikramaboopathi, Karnataka (IN); Rajesh Ranganathan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/931,189

(22) Filed: Sep. 12, 2022

(65) Prior Publication Data

US 2023/0244539 A1 Aug. 3, 2023

(30) Foreign Application Priority Data

Jan. 28, 2022 (IN) .............................. 202241004897

(51) Int. Cl.
*G06F 9/44* (2018.01)
*G06F 9/50* (2006.01)

(52) U.S. Cl.
CPC .................................. *G06F 9/5055* (2013.01)

(58) Field of Classification Search
CPC ...................................................... G06F 9/5055
USPC ....................................................... 719/320
See application file for complete search history.

(56) References Cited

U.S. PATENT DOCUMENTS

| | | | |
|---|---|---|---|
| 5,828,569 A | 10/1998 | Fisher | |
| 5,875,291 A | 2/1999 | Fox | |
| 5,889,957 A | 3/1999 | Ratner et al. | |
| 7,313,575 B2 | 12/2007 | Carr et al. | |
| 8,880,665 B2 | 11/2014 | Moon et al. | |
| 2003/0220901 A1 | 11/2003 | Carr et al. | |
| 2005/0188094 A1 | 8/2005 | Tinker | |
| 2009/0248669 A1 | 10/2009 | Shetti et al. | |
| 2015/0120913 A1* | 4/2015 | Hartley | H04L 67/101 709/224 |
| 2015/0278699 A1 | 10/2015 | Danielsson | |

FOREIGN PATENT DOCUMENTS

WO 2017/175033 A1 10/2017

\* cited by examiner

*Primary Examiner* — Timothy A Mudrick
(74) *Attorney, Agent, or Firm* — Slater Matsil, LLP (57) ABSTRACT

Example techniques for allocating a candidate server instance for execution of an application instance are described. In an example, a request for allocation of a candidate server instance from multiple server instances is received. The request for allocation of the candidate server instance comprises allocation parameters to uniquely identify the candidate server instance from the plurality of server instances. Subsequently, operational parameters of the candidate server instance are analyzed to determine eligibility of the candidate server instance for execution of the application instance. The candidate server instance is subsequently allocated for execution of the application instance based on the eligibility.

19 Claims, 6 Drawing Sheets

SERVER INSTANCE ALLOCATION FOR EXECUTION OF APPLICATION INSTANCES

BACKGROUND

Modern server computers provide functionality that allows development and deployment of online transactional processing (OLTP) applications. OLTP applications are utilized in environments that entail high continuous uptime and high fault tolerance. Examples of such environments include, but are not limited to, airports, banks, stock exchanges, and telecommunication service providers. To provide continuous uptime and high fault tolerance, such server computers are equipped with redundant components for most of the components included therein. Usually, such server computers operate with multiple application instances pairs, such that a backup instance of an application executing on a redundant server instance takes over when a main instance of the application operating on a main server instance fails.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

A server computer generally includes multiple server instances, where each of the multiple server instances may execute multiple application instances. A number of application instances that may be executed at a server instance depends on configuration of the server instance which defines a capability of the server instance.

Server computers handle operations of application instances based on a set of rules. For instance, the set of rules may indicate a manner of allocation of a server instance for execution of an application instance, to facilitate balanced and effective usage of the server instances. Such allocation of server instances for ensuring efficient usage of computational resources at each of the multiple server instances is generally referred to as load balancing.

Known load balancing techniques, generally, manage allocation of server instances to application instances in a round robin manner. For instance, on receiving multiple requests for allocation of server instances to execute application instances, a known load balancing technique may sequentially allocate the server instances from the multiple server instances.

There may be situations when an application instance may have to be executed on a selected sever instance. Such situations may be attributed to various reasons, such as presence of a hardware and/or firmware capability on the server instance that allows execution of the application instance or availability of a hardware and/or firmware capability on the server instance that allows faster execution of the application instance. In such situations, since the allocation of server instances is carried out in round robin manner, establishment of the application instance session on the selected server instance is difficult.

According to examples of the present subject matter, techniques for allocating a requested server instance for execution of an application instance are disclosed.

In an example, the techniques involve receiving a request for allocation of a server instance for execution of an application instance. The request for allocation of the server instance may include allocation parameters, where the allocation parameters are indicative of identification details of the candidate server instance. For the ease of reference and explanation, a requested server instance for which request for allocation is received has been referred to as the 'candidate sever instance', throughout the description.

According to examples of present subject matter, the allocation parameters may include, but are not limited to, an identifier of the candidate server instance, such as a unique identifier of the candidate server instance, name of the candidate server instance, an internet protocol (IP) address of the candidate server instance and a media access control (MAC) address of the candidate server instance.

Upon receipt of the request for allocation of the candidate server instance, the candidate server instance may be identified and analyzed based on operational parameters of the candidate server instance. In an example, the operational parameters of the candidate server instance are indicative of eligibility of the candidate server instance to execute the application instance.

The analysis of the candidate server instance based on the operational parameters may allow determination of whether the candidate server instance is eligible to be allocated for execution of the application instance or not. If the candidate server instance is determined to be eligible for execution of the application instance, the request for allocation of the candidate server instance may be forwarded to the candidate server instance.

On the other hand, if the candidate server instance is found ineligible for execution of the application instance, the request for allocation of the candidate server instance is queued. For instance, if it is determined that a number of application instances being executed at the candidate server instance are greater than or equal to a threshold number of application instances, it may be concluded that the candidate server instance may not be able to execute any more application instances. In such a situation, it may be determined that the candidate server instance is ineligible for execution of the application instance.

In an example, the request for allocation of the server instance may further include a timeout period value indicative of a time period for which the request for allocation of the candidate server instance may be queued during allocation of the server instance. Subsequently, the candidate server instance may be monitored for detecting a change in at least one of the operational parameters of the candidate server instance. In an example, the candidate server instance may be monitored for the timeout period.

If a change is detected in the at least one of operational parameters before expiration of the timeout period, the operational parameters may be reanalyzed to determine if the candidate server instance is eligible to be allocated for execution of the application instance.

Conversely, on expiration of the timeout period, a notification indicating inability of allocation of the candidate server instance may be generated. Subsequently, in an example, a request for the allocation of the candidate server instance may be requeued.

In another example, once the notification indicating the inability of allocation the candidate server instance is generated, operational parameters of other server instances from the multiple server instances having configuration similar to the candidate server instance may be analyzed to determine if the other server instances are eligible for execution of the application instance.

In yet another example, subsequent to the generation of the notification indicating the inability of allocation of the candidate server instance, a client device may be notified that the candidate server instance could not be allocated and the request for allocation of the candidate server instance is rejected.

Allocating a requested server instance for execution of the application instance while taking into consideration capabilities of the requested server instance allows thorough exploitation of the capabilities of the requested server instance.

The above techniques are further described with reference to FIG. 1 to FIG. 6. It should be noted that the description and the figures merely illustrate the principles of the present subject matter along with examples described herein and should not be construed as a limitation to the present subject matter. It is thus understood that various arrangements may be devised that although not explicitly described or shown herein, statements herein reciting principles, aspects, and implementations of the present subject matter, as well as specific examples thereof, are intended to encompass equivalents thereof.

Figure 1:
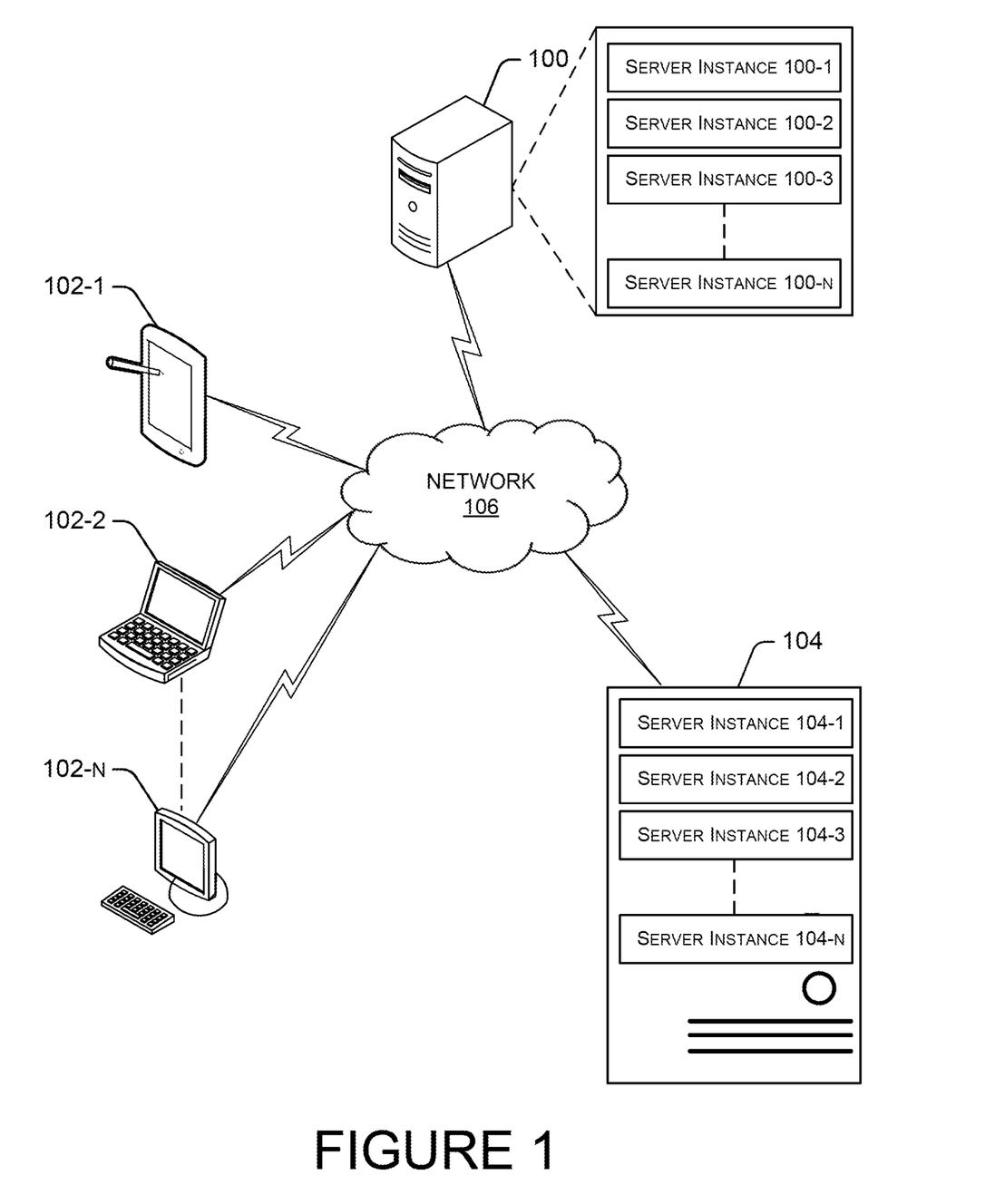
FIG. 1 illustrates a computing environment implementing a system for allocation of a requested server instance for execution of an application instance, in accordance with an example of the present subject matter.

FIG. 1 illustrates a communication network implementing a system 100 for allocating a candidate server instance for execution of an application instance, in accordance with an example of the present subject matter. The system 100 may either be a standalone computer or a combination of multiple computing devices operating together in a distributed computing environment. In an example, the system 100, among other functions, may facilitate execution of application instances for multiple client devices 102-1, 102-2, . . . , 102-n. Examples of the system 100 may include, but are not limited to, laptops, desktops, personal digital assistants (PDAs), smartphones, tower servers, rack servers, blade servers, and mainframes.

The system 100 may be connected to the multiple client devices 102-1, 102-2, . . . , 102-n through a network 106. The system 100 may be communicatively coupled to the multiple client devices 102-1, 102-2, . . . 102-n either through a direct communication link, or through multiple communication links of the network 106. For the ease of reference, the multiple client devices 102-1, 102-2, . . . , 102-n have been referred to as the multiple client devices 102, hereinafter.

In an example, the multiple client devices 102 may be utilized as an interface for exploitation of various hardware and firmware capabilities of the system 100. For instance, a client device from the multiple client devices 102 may allow a user to access the system 100 through a web browser for execution of an application instance, for example, due to non-availability of a hardware and/or firmware configuration on the client device. In the example, the application instance may be executed on one of multiple server instances, such as server instance 100-1, server instance 100-2, server instance 100-3, . . . , server instance 100-N, executing on the system 100.

In another example, the system 100 may be utilized as an interface between the multiple client devices 102 and a server computer 104 having multiple server instances, such as server instance 104-1, server instance 104-2, server instance 104-3, . . . , server instance 104-N, for execution of the application instances. In the example, the server computer 104 may be connected to the multiple client devices 102 and the system 100 via the network 106. In the example, the system 100 may facilitate identification and allocation of a candidate server instance from the multiple server instances, for execution of the application instances.

The network 106 may be a wireless or a wired network, or a combination thereof. The network 106 can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the communication network includes various network entities, such as gateways and routers; however, such details have been omitted to maintain the brevity of the description.

In an example, the system 100 may receive a request for allocation of a candidate server instance for execution of an application instance. The request for allocation of the candidate server instance may be received from a client device, say client device 102-1, from the multiple client devices 102 and may include allocation parameters indicative of identification details of the candidate server instance.

The system 100, on receipt of the request for allocation of the candidate server instance, may identify the candidate server instance and determine eligibility of the candidate server instance for execution of the application instance. The system 100 may determine eligibility of the candidate server instance based on the analysis of operational parameters of the candidate server instance, where the operational parameters are indicative of eligibility of the candidate server instance to execute the application instance. Based on the eligibility, the system 100 may allocate the candidate server instance for execution of the application. The manner in which allocation of the requested server instance to execute the application instance is handled, is further explained in reference to forthcoming figures.

Figure 2:
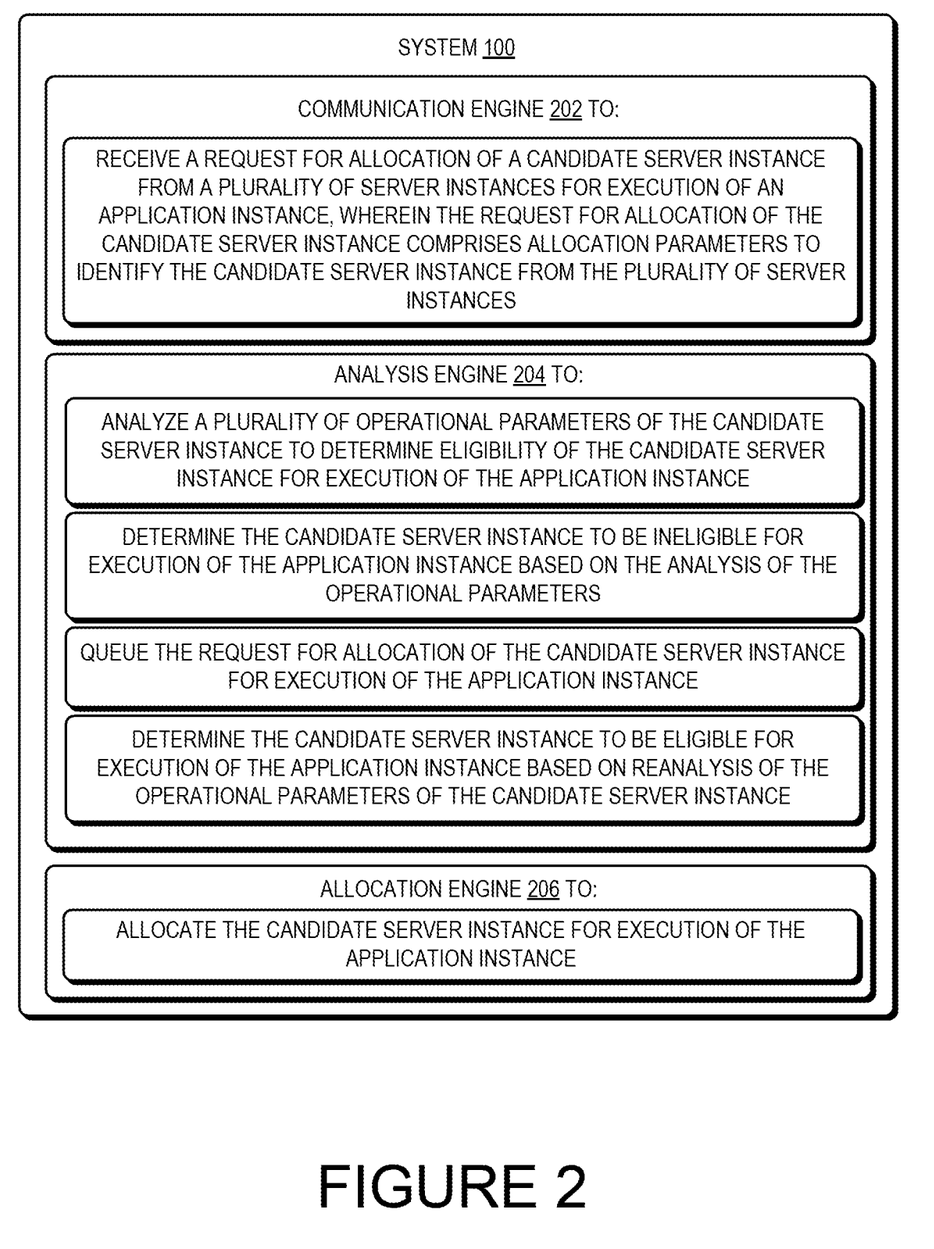
FIG. 2 illustrates the system for allocation of the requested server instance for execution of the application instance, in accordance with an example of the present subject matter.

FIG. 2 illustrates the system 100 for allocating a candidate server instance for execution of an application instance, in accordance with an example of the present subject matter.

As already described, the system 100, in an example, may have multiple server instances 100-1, 100-2, 100-3, . . . , 100-n for execution of multiple application instances. In the example, the multiple server instances may have different hardware and firmware configurations for execution of the multiple application instances. Further, the system 100, in another example, may be connected to a remotely located server computer having multiple server instances 104-1, 104-2, 104-3, . . . , 104-n for execution of the application instances. In the example, the system 100 may facilitate identification of the candidate server instance from the multiple server instances, for execution of the application instance.

The system 100 may include a communication engine 202 to receive a request for allocation of a candidate server instance from the multiple server instances. The request for allocation of the candidate server instance may include allocation parameters for uniquely identifying the candidate server instance from the multiple server instances.

The system 100 may further include an analysis engine 204 coupled to the communication engine 202. In an example, the analysis engine 204 may identify the candidate server instance and determine if the candidate server instance can be allocated for execution of the application instance. In the example, the analysis engine 204 may analyze multiple operational parameters of the candidate server instance to determine eligibility of the candidate server instance for execution of the application instance. If the analysis engine 204 determines that the candidate server instance is eligible for execution of the application, the analysis engine 204 may facilitate execution of the application instance on the candidate server instance.

On the other hand, if the analysis engine 204 determines the candidate server instance to be ineligible for execution of the application instance, the analysis engine 204 may queue the request for allocation of the candidate server instance for execution of the application instance. Subsequently, the analysis engine 204 may reanalyze the multiple operational parameters to identify if the candidate server instance has become eligible for execution of the application instance.

The system 100 may further include an allocation engine 306 coupled to the analysis engine 204. In an example, based on the reanalysis of the multiple operational parameters, the analysis engine 204 may determine that the candidate sever instance has become eligible for execution of the application instance. In such a case, the allocation engine 306 may allocate the candidate server instance for execution of the application instance. The manner in which the candidate server instance is allocated for execution of the application instance is described in detail in conjunction with FIG. 3.

Figure 3:
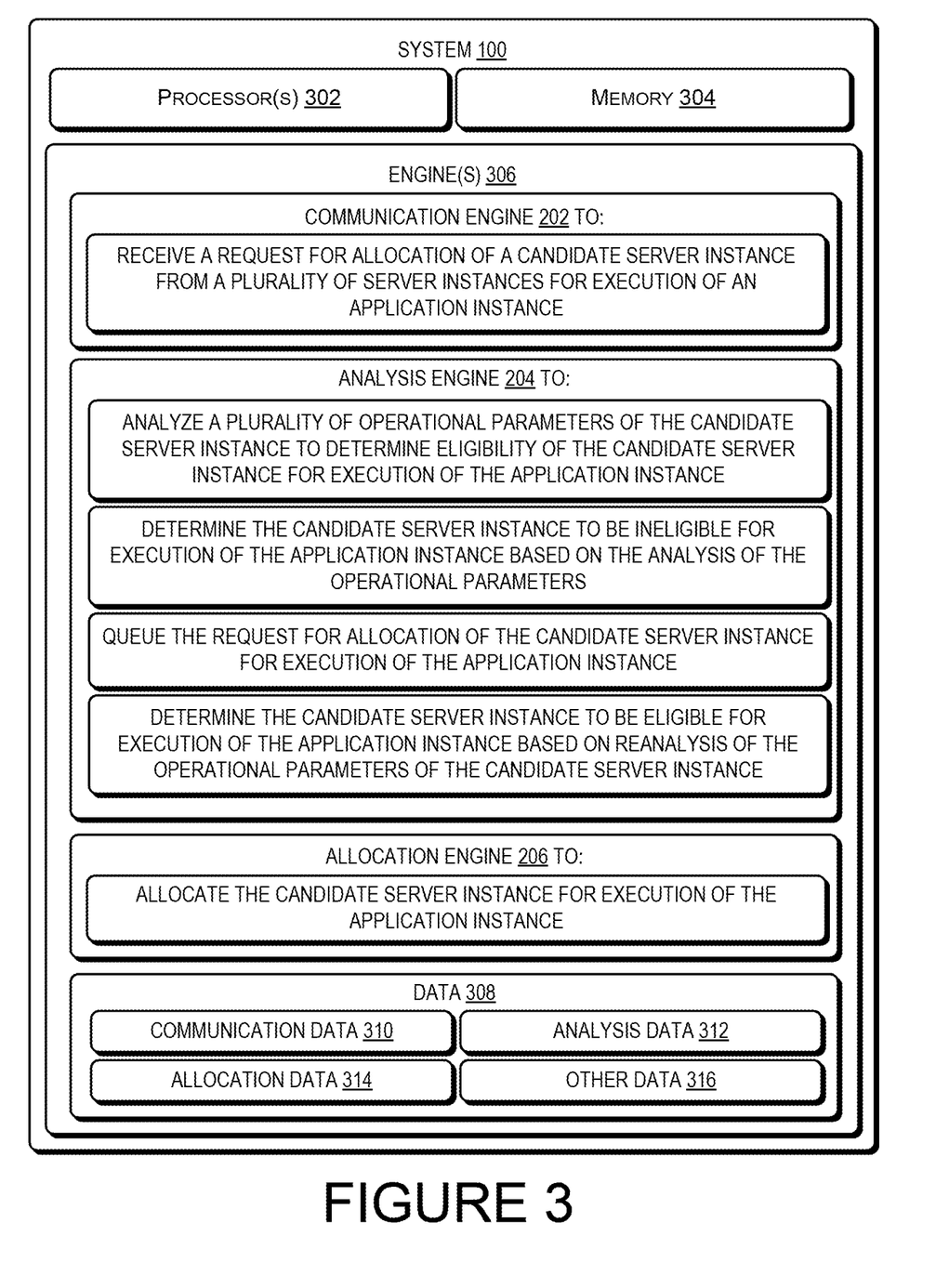
FIG. 3 illustrates the system for allocation of the candidate server instance for execution of the application instance, in accordance with another example of the present subject matter.

FIG. 3 illustrates the system 100 for allocating the candidate server instance for execution of the application instance, in accordance with an example of the present subject matter. As already described, examples of the system 100 may include, but are not limited to, laptops, desktops, personal digital assistants (PDAs), smartphones, tower servers, rack servers, blade servers, and mainframes.

The system 100 may include a processor 302 and a memory 304 coupled to the processor 302. The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included.

The memory 304 may include any computer-readable medium including, for example, volatile memory (e.g., RAM), and/or non-volatile memory (e.g., EPROM, flash memory, etc.).

The system 100 may further include engines 306, where the engines 306 may include the communication engine 202, the analysis engine 204 coupled to the communication engine 202, and the allocation engine 306 coupled to the analysis engine 204. In an example, the engines 306 may be implemented as a combination of hardware and firmware or software. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the system 100 may include the machine-readable storage medium storing the instructions and the processing resource to execute the instructions. In other examples of the present subject matter, the machine-readable storage medium may be located at a different location but accessible to the system 100 and the processor 302.

The system 100 may further include data 308, that serves, amongst other things, as a repository for storing data that may be fetched, processed, received, or generated by the communication engine 202, the analysis engine 204, and the allocation engine 206. The data 308 may include communication data 310, analysis data 312, allocation data 314, and other data 316. In an example, the data 308 may be stored in the memory 304.

In an example implementation, the communication engine 202 may receive a request for allocation of a candidate server instance from the multiple server instances for execution of the application instance. The request for allocation of the candidate server instance includes allocation parameters to uniquely identify the candidate server instance from the multiple server instances. The allocation parameters may include, but are not limited to, an identifier of the candidate server instance, such as a unique identifier of the candidate server instance, name of the candidate server instance, an internet protocol (IP) address of the candidate server instance and a media access control (MAC) address of the candidate server instance. The communication engine 202 may store the received allocation parameters in the communication data 310.

Based on the allocation parameters, the analysis engine 204 may identify the candidate server instance from the multiple server instances. Subsequently, the analysis engine 204 may analyze multiple operational parameters of the candidate server instance to identify whether the candidate server instance is eligible for execution of the application instance. The operational parameters of the candidate server instance are indicative of eligibility of the candidate server instance to execute the application instance. Examples of the operational parameters of the candidate server instance may include, but are not limited to, number of application instances being executed on the candidate server instance, load bearing capability of the candidate server instance to handle more application instances for execution, and amount of computational power available with the candidate sever instance. If the analysis engine 204 determines that the candidate server instance is eligible for execution of the application instance, the allocation engine 306 may forward the request for allocation of the candidate server instance, to the candidate server instance.

In an illustrative example, once the candidate server instance has been identified, the analysis engine 204 may determine a number of application instances being executed on the candidate server instance. In the example, each of the multiple server instances may execute a threshold number of application instances simultaneously, where the threshold number of application instances are decided based on the hardware and/or firmware configuration of the multiple server instances. If the analysis engine 204 determines the number of application instances being executed on the candidate server instance to be less than threshold number of application instances, the analysis engine 204 may determine the candidate server instance to be eligible for execution of an application instance.

In an example, along with the number of application instances being executed on the candidate server instance, the analysis engine 204 may also analyze other operational parameters, such as an amount of computational power available with the candidate server instance. In the example, based on the analysis of the multiple operational parameters, the analysis engine 204 may compute an allocation score for the candidate server instance. The analysis engine 204 may then compare the allocation score with a threshold allocation score to confirm if the candidate server instance is indeed eligible for execution of the application instance. If the analysis engine 204 determines that the allocation score for the candidate server instance is higher than the threshold allocation score, the analysis engine 204 may proceed with allocation of the candidate server instance for execution of the application instance.

Conversely, if the analysis engine 204 determines that the allocation score for the candidate server instance is less than the threshold allocation score, the analysis engine 204 may determine the candidate server instance to be ineligible for execution of the application instance. In such a situation, the analysis engine 204 may queue the request for allocation of the candidate server instance.

In an example, the request for allocation of the candidate server instance may include a timeout period value indicative of a time period for which the request for allocation of the candidate server instance may be queued during allocation of the server instance. In the example, the request for allocation of the candidate server instance may be queued for the timeout period value. While the request for allocation of the candidate server instance is queued, the analysis engine 204 may monitor the operational parameters of the candidate server instance. If the analysis engine 204 detects a change in at least one of the operational parameters during the timeout period value, the analysis engine 204 may reanalyze the multiple operational parameters of the candidate server instance to compute a revised allocation score for the candidate server instance.

For instance, if the number of applications being executed at the candidate server instance are found to be greater than or equal to the threshold number of application instances, the analysis engine 204 may keep reanalyzing the number of application instances being executed at the candidate server instance. As soon as the analysis engine 204 determines that there has been a change in the number of application instances being executed at the candidate server instance, the analysis engine 204 may reanalyze other operational parameters of the candidate server instance to compute the revised allocation score for the candidate server instance. Based on the revised allocation score, the candidate server instance may redetermine the eligibility of the candidate server instance for execution of the application instance.

In an example, on reanalysis of the multiple operational parameters of the candidate server instance, the analysis engine 204 may determine that the candidate server instance is eligible for execution of the application instance. In the example, the allocation engine 206 may allocate the candidate server instance for execution of the application instance.

In another example, on reanalysis of the multiple operational parameters of the candidate server instance, the analysis engine 204 may determine that the candidate server instance is still ineligible for execution of the application instance. In the example, the analysis engine 204 may wait for expiration of the timeout period. Meanwhile, the analysis engine 204 may keep reanalyzing the operational parameters of the candidate server instance. If the candidate server instance is determined to be ineligible for execution of the application instance at the end of the expiration of the timeout period value, the allocation engine 206 may generate a notification for a client device requesting the execution of the application instance, where the notification may indicate inability of allocation of the candidate server instance for execution of the application instance.

Subsequently, in an example, the analysis engine 204 may requeue a request for the allocation of the candidate server instance. In another example, once the notification indicating the inability of allocation the candidate server instance is generated, the analysis engine 204 may analyze operational parameters of other server instances from the multiple server instances having configuration similar to the candidate server instance, to determine if the other server instances are eligible for execution of the application instance. In the example, there may be a situation when the analysis engine 204 identifies more than one server instances are fulfilling the eligibility criteria. In such a situation, the allocation engine 206 may randomly allocate one of such server instances for execution of the application.

In yet another example, subsequent to the generation of the notification indicating the inability of allocation of the candidate server instance, the allocation engine 206 may notify a client device that the candidate server instance could not be allocated and reject the request for allocation of the candidate server instance.

Allocating a requested server instance for execution of the application instance while taking into consideration capabilities of the specific server instance allows thorough exploitation of the capabilities of the requested server instance.

Figure 4:
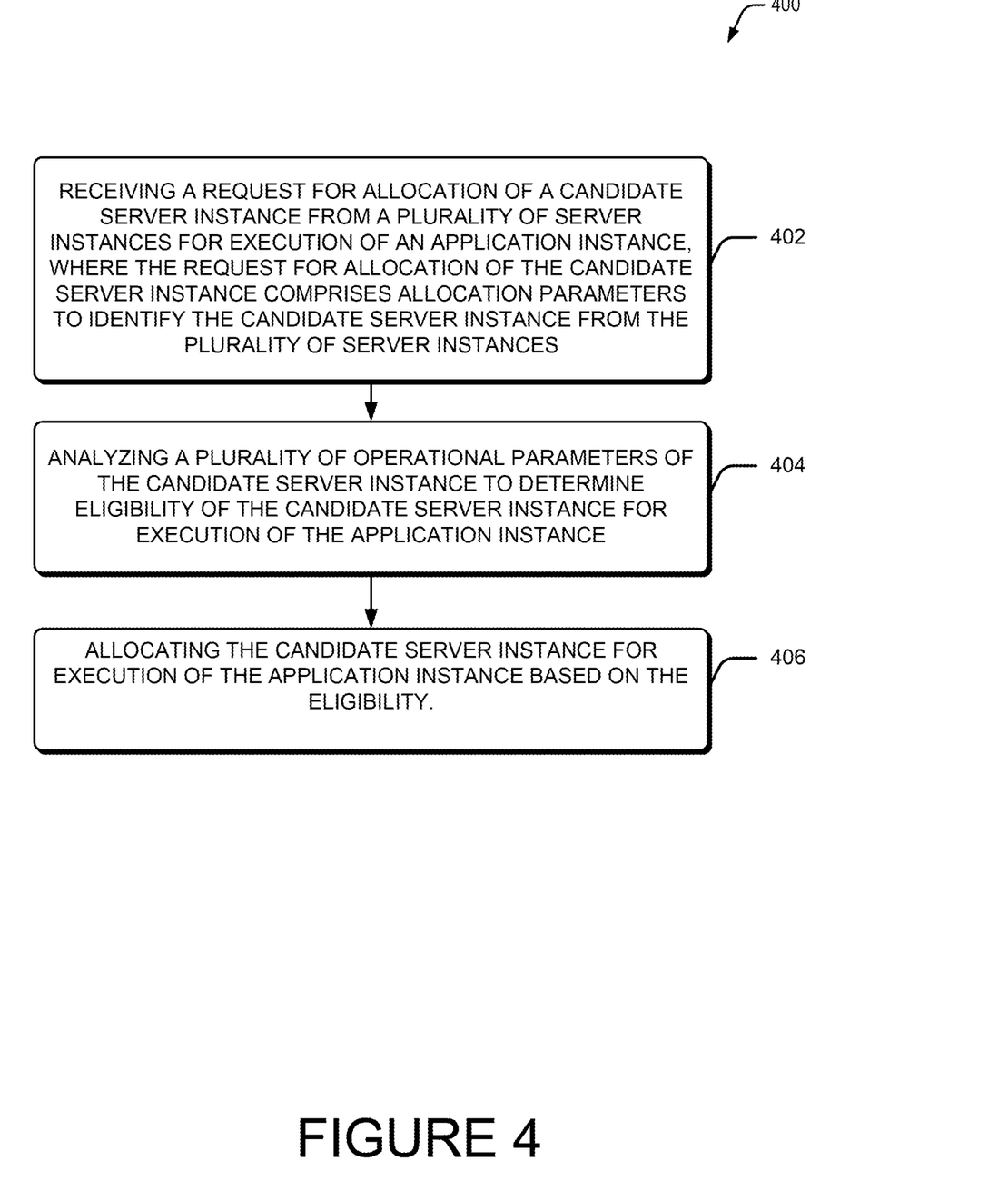
FIG. 4 illustrates a method for allocating the requested server instance for execution of the application instance, in accordance with an example of the present subject matter.
Figure 5:
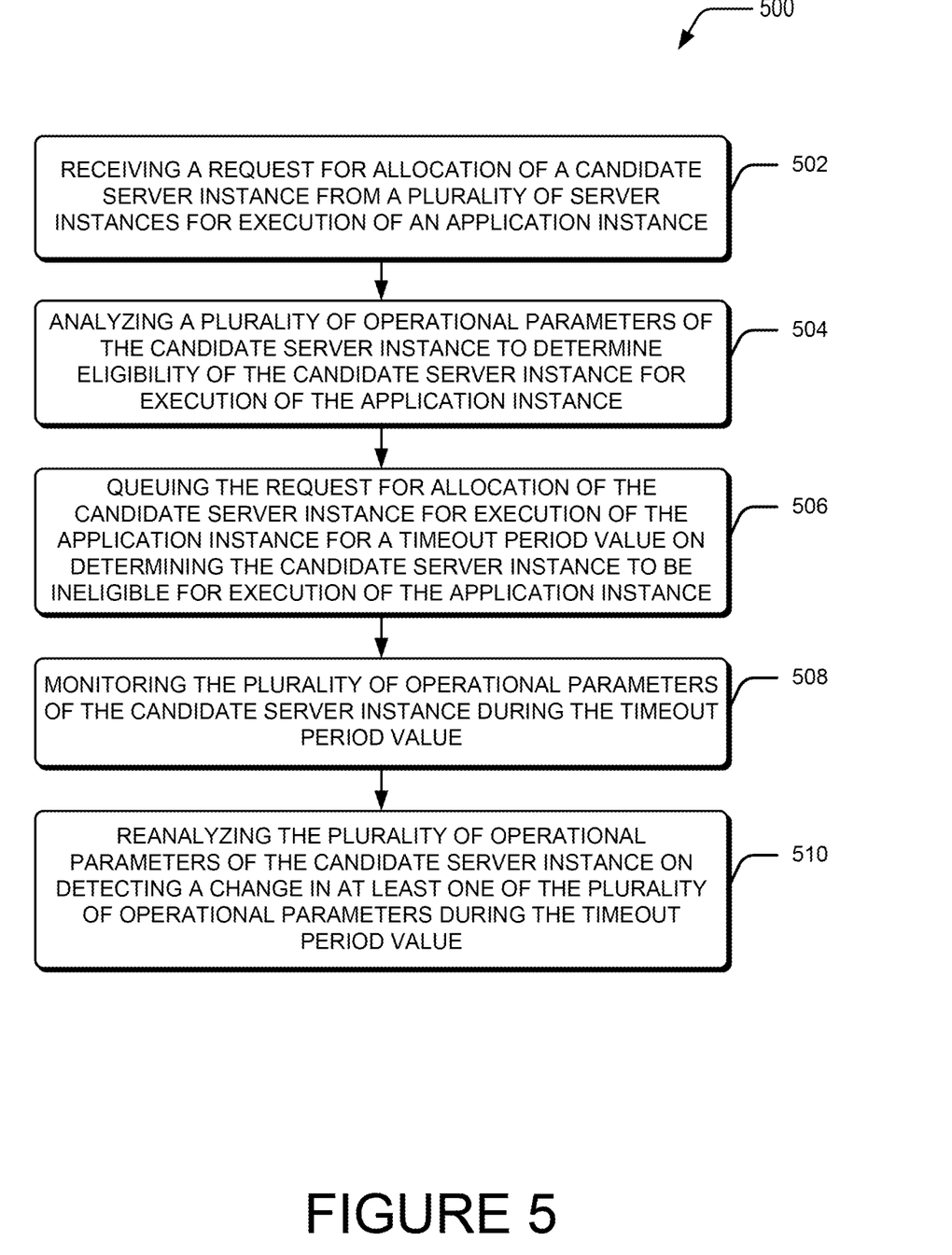
FIG. 5 illustrates a method for allocating the requested server instance for execution of the application instance, in accordance with another example of the present subject matter.

FIGS. 4 and 5 illustrate methods for allocating a requested server instance for execution of an application instance, in accordance with examples of the present subject matter. Although the methods 400 and 500 may be implemented for servicing of a variety of computing devices, for the ease of explanation, the present description of the example methods 400 and 500 is provided in reference to the above-described system 100. The order in which the various method blocks of methods 400 and 500 are described, is not intended to be construed as a limitation, and any number of the described method blocks may be combined in any order to implement the methods 400 and 500, or an alternative method.

The blocks of the methods 400 and 500 may be implemented through instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 402, a request for allocation of a candidate server instance from a plurality of server instances for execution of an application instance may be received. In an example, the request for allocation of the candidate server instance may include allocation parameters to uniquely identify the candidate server instance from the plurality of server instances. Examples of allocation parameters may include an identifier of the candidate server instance, such as a unique identifier of the candidate server instance, name of the candidate server instance, an internet protocol (IP) address of the candidate server instance and a media access control (MAC) address of the candidate server instance. In the example, the request for allocation of the candidate server instance may be received by a communication engine 202 of the system 100.

At block 404, operational parameters of the candidate server instance may be analyzed to determine eligibility of the candidate server instance for execution of the application instance. In an example, the candidate server instance may be identified from the plurality of server instances based on the allocation parameters. Subsequently, the operational parameters of the candidate server instance, such as number of application instances being executed on the candidate server instance, load capability to handle more application instances for execution, and amount of computational power available with the candidate sever instance, may be analyzed to determine eligibility of the candidate server instance for execution of the application instance. In the example, the operational parameters of the candidate server instance may be analyzed by an analysis engine 204 of the system 100.

At block 406, the candidate server instance may be allocated for execution of the application instance based on the eligibility. In an example, the candidate server instance may be allocated for execution of the application instance by an allocation engine 306 of the system 100.

FIG. 5 illustrates a method for allocating a requested server instance for execution of an application instance, in accordance with an example of the present subject matter.

At block 502, a request for allocation of a candidate server instance from a plurality of server instances for execution of an application instance may be received. In an example, the request for allocation of the candidate server instance may include allocation parameters to uniquely identify the candidate server instance from the plurality of server instances. In the example, the request for allocation of the candidate server instance may be received by a communication engine 202 of the system 100.

At block 504, operational parameters of the candidate server instance may be analyzed to determine eligibility of the candidate server instance for execution of the application instance. In an example, the candidate server instance may be identified from the plurality of server instances based on the allocation parameters.

Subsequently, the operational parameters of the candidate server instance may be analyzed to determine eligibility of the candidate server instance for execution of the application instance. In an example, based on the analysis of the operational parameters of the candidate server instance, an allocation score may be computed for the candidate server instance. The allocation score for the candidate server instance may then be compared with a threshold allocation score. In the example, based on a result of comparison of the allocation score and the threshold allocation score, it may be determined whether the candidate server instance is eligible for execution of the application instance or not. The operational parameters of the candidate server instance may be analyzed by the analysis engine 204.

At block 506, the request for allocation of the candidate server instance may be queued on determining the candidate server instance to be ineligible for execution of the application instance. The candidate server instance may be determined to be ineligible due to multiple reasons. For instance, if it is determined that a number of application instances being executed at the candidate server instance are greater than or equal to a threshold number of application instances, it may be concluded that the candidate server instance may not be able to execute any more application instances. In an example, the request for allocation of the candidate server instance may be queued for a timeout period value. In the example, the timeout period value may be received with the request for allocation of the candidate server instance. In the example, the request for allocation of the candidate server instance may be queued by the analysis engine 204.

At block 508, operational parameters of the candidate server instance may be monitored for detecting a change in any of the operational parameters. In an example, the operational parameters of the candidate server instance may be monitored for the timeout period value. In the example, the operational parameters may be monitored by the analysis engine 204.

At block 510, the operational parameters of the candidate server instance may be reanalyzed. In an example, the operational parameters of the candidate server instance may be reanalyzed on detecting a change in at least one of the operational parameters during the timeout period value. In the example, if it is determined that the candidate server instance is eligible for execution of the application instance, the candidate server instance is allocated for the execution of the application instance. On the other hand, if it is determined that the candidate server instance is still ineligible for execution of the application instance, operational parameters of other server instances from the multiple server instances having configuration similar to the candidate server instance, may be analyzed to determine if the other server instances are eligible for execution of the application instance. In a situation where more than one server instances are determined to be eligible for execution of the application instance, a server instance from the more than one server instances may be randomly allocated for execution of the application instance.

Figure 6:
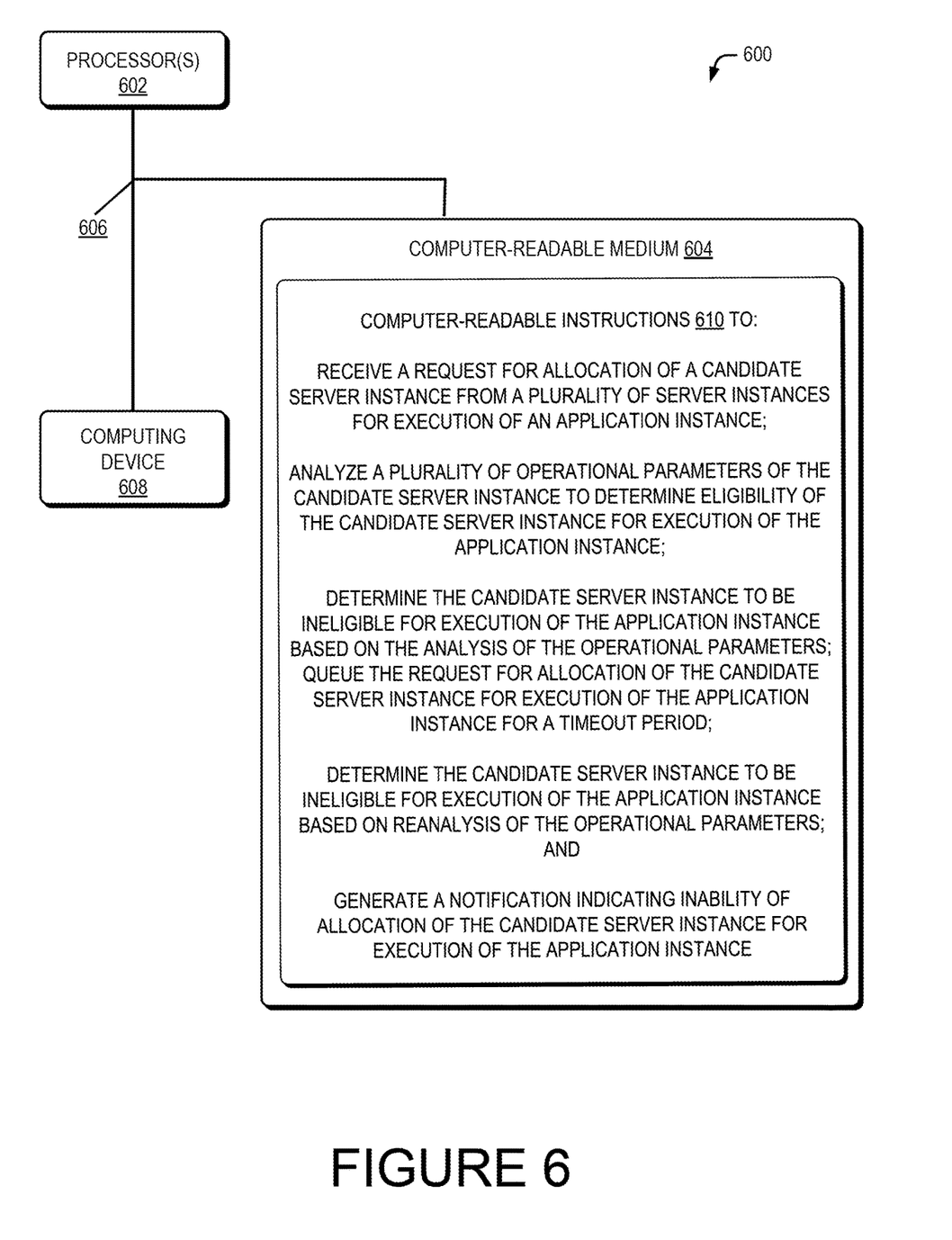
FIG. 6 illustrates a non-transitory computer-readable medium for allocating the requested server instance for execution of the application instance, in accordance with an example of the present subject matter.

FIG. 6 illustrates a computing environment 600 implementing a non-transitory computer readable medium for allocation of a candidate server instance, in accordance with an example of the present subject matter. In an example, the computing environment 600 includes processor 602 communicatively coupled to a non-transitory computer readable medium 604 through communication link 606. In an example implementation, the computing environment 600 may be for example, the system 100. In an example, the processor 602 may have one or more processing resources for fetching and executing computer-readable instructions from the non-transitory computer readable medium 604. The processor 602 and the non-transitory computer readable medium 604 may be implemented, for example, in the system 100.

The non-transitory computer readable medium 604 may be, for example, an internal memory device or an external memory. In an example implementation, the communication link 606 may be a network communication link, or other communication links, such as a PCI (Peripheral component interconnect) Express, USB-C (Universal Serial Bus Type-C) interfaces, I²C (Inter-Integrated Circuit) interfaces, etc. In an example implementation, the non-transitory computer readable medium 604 includes a set of computer readable instructions 610 which may be accessed by the processor 602 through the communication link 606 and subsequently executed for allocation of the candidate server instance for execution of the application instance. The processor(s) 602 and the non-transitory computer readable medium 604 may also be communicatively coupled to a computing device 608 over the network.

Referring to FIG. 6, in an example, the non-transitory computer readable medium 604 includes computer readable instructions 610 that cause the processor 602 to receive a request for allocation of a candidate server instance from multiple server instances for execution of an application instance. In an example, the request for allocation of the candidate server instance comprises allocation parameters to uniquely identify the candidate server instance from multiple server instances.

The instructions 610 may further cause the processor 602 to analyze various operational parameters of the candidate server instance to determine eligibility of the candidate server instance for execution of the application instance. The various operational parameters of the candidate server instance may include, but are not limited to, number of application instances being executed on the candidate server instance, load capability to handle more application instances for execution, and amount of computational power available with the candidate sever instance. In an example, the instructions 610 may cause the processor 602 to compute an allocation score for the candidate server instance based on the analysis of the various allocation parameters of the candidate server instance.

The instructions 610 may cause the processor 602 to determine the candidate server instance to be ineligible for execution of the application instance based on the analysis of the operational parameters. In an example, the instructions 610 may cause the processor 602 to determine candidate server instance to be ineligible for execution of the application instance based on determining the allocation score for the candidate server instance to be lower than a threshold allocation score.

The instructions 610 may further cause the processor 602 to queue the request for allocation of the candidate server instance for execution of the application instance for a timeout period. In an example, the timeout period may be received with the request for allocation of the candidate server instance.

The instructions 610 may further cause the processor 602 to determine the candidate server instance to be ineligible for execution of the application instance based on reanalysis of the operational parameters. In an example, on determining the candidate serve instance to be ineligible for execution of the candidate server instance based on the reanalysis of the operational parameters, the instructions 610 may cause the processor 602 to generate a notification, to be sent to a client device requesting the execution of the application instance, indicating inability of allocation of the candidate server instance for execution of the application instance.

In another example, on determining the candidate serve instance to be ineligible for execution of the candidate server instance based on the reanalysis of the operational parameters, the instructions 610 may cause the processor 602 to requeue the request for allocation of the candidate server instance for execution of the application instance.

In yet another example, on determining the candidate serve instance to be ineligible for execution of the candidate server instance based on the reanalysis of the operational parameters, the instructions 610 may cause the processor 602 to identify another server instance from the multiple server instances for execution of the application instance. The other server instances may be identified based on a comparison of configurations of the candidate server instance and the other server instances. In the example, to identify the other server instance from the multiple server instances for execution of the application instance, the instructions 610 may cause the processor 602 to analyze the operational parameters of the other server instance to determine the server instance to be eligible for execution of the application instance. If the other server instance is determined to be eligible for execution of the application instance, the instructions 610 may cause the processor 602 to allocate the other server instance for execution of the application instance.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method comprising:
receiving a request for allocation of a candidate server instance from a plurality of server instances for execution of an application instance, wherein the request for allocation of the candidate server instance comprises allocation parameters to identify the candidate server instance from the plurality of server instances;
analyzing a plurality of operational parameters of the candidate server instance to determine eligibility or ineligibility of the candidate server instance for execution of the application instance;
queuing the request for allocation of the candidate server instance in response to determining that the candidate server instance is currently ineligible for execution of the application instance; and
allocating, after queuing the request for allocation, the candidate server instance for execution of the application instance based on the candidate server instance gaining the eligibility.

2. The method as claimed in claim 1, wherein the method further comprises:
computing an allocation score for the candidate server instance based on the analysis of the plurality of operational parameters; and
comparing the allocation score with a threshold allocation score to determine the eligibility or the ineligibility of the candidate server instance for execution of the application instance.

3. The method as claimed in claim 1, wherein the request for allocation of the candidate server instance further comprises a timeout period value, wherein the timeout period value is indicative of a time period for which the request for allocation of the candidate server instance is to be queued.

4. The method as claimed in claim 3, wherein queuing the request for allocation of the candidate server instance comprises queuing the request for allocation of the candidate server instance for the timeout period value.

5. The method as claimed in claim 3, further comprising:
monitoring the plurality of operational parameters of the candidate server instance for the timeout period value; and
reanalyzing the plurality of operational parameters of the candidate server instance in response to detecting a change in at least one of the plurality of operational parameters during the timeout period value.

6. The method as claimed in claim 5 further comprising:
identifying a second plurality of server instances from the plurality of server instances for execution of the application instance based on a comparison of configurations of the candidate server instance and the second plurality of server instances; and
allocating a server instance from the second plurality of server instances for execution of the application instance.

7. A system comprising:
a communication engine configured to:
receive a request for allocation of a candidate server instance from a plurality of server instances for execution of an application instance,
wherein the request for allocation of the candidate server instance comprises allocation parameters to identify the candidate server instance from the plurality of server instances;
an analysis engine coupled to the communication engine and configured to:
analyze a plurality of operational parameters of the candidate server instance to determine eligibility of the candidate server instance for execution of the application instance;
determine the candidate server instance to be ineligible for execution of the application instance based on the analysis of the operational parameters;
queue the request for allocation of the candidate server instance for execution of the application instance; and
determine the candidate server instance to be eligible for execution of the application instance based on reanalysis of the plurality of operational parameters of the candidate server instance; and
an allocation engine coupled to the analysis engine and configured to allocate the candidate server instance for execution of the application instance after the reanalysis.

8. The system of claim 7, wherein to determine the candidate server instance to be ineligible for execution of the application instance, the analysis engine is further configured to:
compute an allocation score for the candidate server instance based on the analysis of the plurality of operational parameters; and
determine the allocation score to be lower than a threshold allocation score.

9. The system of claim 7, wherein:
the request for allocation of the candidate server instance further comprises a timeout period value, and
the timeout period value is indicative of a time period for which the request for allocation of the candidate server instance is to be queued.

10. The system of claim 9, wherein the analysis engine is further configured to queue the request for allocation of the candidate server instance for the timeout period value.

11. The system of claim 7, wherein the analysis engine is further configured to reanalyze the operational parameters of the candidate server instance based on detecting a change in the at least one of the plurality of operational parameters.

12. The system of claim 11, wherein, to determine the candidate server instance to be eligible for execution of the application instance, the analysis engine is further configured to:
compute a revised allocation score for the candidate server instance based on the reanalysis of the operational parameters of the candidate server instance; and
determine the revised allocation score to be higher than a threshold allocation score.

13. The system of claim 7, wherein the allocation parameters comprise one or more of: a name of the candidate server instance, an internet protocol (IP) address of the candidate server instance, and a media access control (MAC) address of the candidate server instance.

14. The system of claim 7, wherein the operational parameters of the candidate server instance comprise one or more of:
a number of application instances being executed on the candidate server instance,
load capability to handle more application instances for execution, and
an amount of computational power available with the candidate sever instance.

15. A non-transitory computer-readable medium comprising instructions that, when executed, cause a processing resource of a computing device to:
receive a request for allocation of a candidate server instance from a plurality of server instances for execution of an application instance, wherein the request for allocation of the candidate server instance comprises allocation parameters to identify the candidate server instance from the plurality of server instances;
analyze a plurality of operational parameters of the candidate server instance to determine eligibility or ineligibility of the candidate server instance for execution of the application instance;
determine the candidate server instance to be ineligible for execution of the application instance based on the analysis of the operational parameters;
queue the request for allocation of the candidate server instance for execution of the application instance for a timeout period;
determine the candidate server instance to be eligible or ineligible for execution of the application instance based on reanalysis of the operational parameters;
allocate the candidate server instance for execution of the application instance when the reanalysis determines the candidate server instance to be eligible; and
generate a notification indicating inability of allocation of the candidate server instance for execution of the application instance when the reanalysis determines the candidate server instance to be ineligible.

16. The non-transitory computer-readable medium of claim 15, wherein to determine the candidate server instance to be ineligible for execution of the application instance, the instructions cause the computing device to:
compute an allocation score for the candidate server instance based on the analysis of the plurality of operational parameters; and determine the allocation score to be lower than a threshold allocation score.

17. The non-transitory computer-readable medium of claim 15, wherein the instructions further cause the computing device to requeue the request for allocation of the candidate server instance for execution of the application instance when the candidate server instance is determined to be ineligible.

18. The non-transitory computer-readable medium of claim 15, wherein the instructions cause the computing device to identify, when the candidate server instance is determined to be ineligible, another server instance from the plurality of server instances for execution of the application instance based on a comparison of configurations of the candidate server instance and other server instances of the plurality of server instances.

19. The non-transitory computer-readable medium as claimed in of claim 15, wherein the instructions cause the computing device to analyze the operational parameters of the another server instance to determine the another server instance to be eligible for execution of the application instance.

\* \* \* \* \*